United States Patent
Gagnon

(10) Patent No.: US 6,279,403 B1
(45) Date of Patent: Aug. 28, 2001

(54) DIFFERENTIAL PRESSURE TRIGGERING DEVICE

(75) Inventor: Michel Gagnon, Pierrefonds (CA)

(73) Assignee: Henlex, Inc., Montreal (CA)

( * ) Notice: Subject to any disclaimer, the term of this patent is extended or adjusted under 35 U.S.C. 154(b) by 0 days.

(21) Appl. No.: 09/425,566

(22) Filed: Oct. 22, 1999

(51) Int. Cl.[7] .................................................. G01T 2/00
(52) U.S. Cl. ............................................................ 73/756
(58) Field of Search ............................... 73/706, 708, 718, 73/724, 726, 728, 754, 756, 861.22

(56) References Cited

U.S. PATENT DOCUMENTS

| | | | |
|---|---|---|---|
| 3,575,054 | 4/1971 | Glista | 73/398 R |
| 3,590,638 | 7/1971 | Anastasia | 73/398 R |
| 3,831,588 | 8/1974 | Rindner | 128/2.05 E |
| 3,967,504 | 7/1976 | Akeley | 73/407 R |
| 4,249,780 | * 2/1981 | Mehren | 308/118 |
| 4,336,567 | 6/1982 | Anastasia | 361/283 |
| 4,373,385 | 2/1983 | Boutteville et al. | 73/146.5 |
| 4,453,412 | 6/1984 | Nakane | 73/728 |
| 4,475,405 | 10/1984 | Corpron et al. | 73/861.24 |
| 4,487,074 | 12/1984 | Herden | 73/708 |
| 4,671,116 | 6/1987 | Glennon et al. | 73/728 |
| 4,716,492 | 12/1987 | Charboneau et al. | 361/283 |
| 4,876,893 | 10/1989 | Kato et al. | 73/726 |
| 5,024,294 | 6/1991 | Van Fossen et al. | 184/108 |
| 5,068,503 | 11/1991 | Sladky | 200/83 L |
| 5,219,041 | 6/1993 | Greve | 184/108 |
| 5,303,595 | 4/1994 | Shoji et al. | 73/728 |
| 5,315,878 | 5/1994 | Birenheide | 73/727 |
| 5,355,714 | 10/1994 | Suzuki et al. | 73/146.5 |
| 5,437,241 | 8/1995 | Rosenberg et al. | 116/268 |
| 5,760,310 | 6/1998 | Rud, Jr. et al. | 73/706 |
| 5,817,943 | 10/1998 | Welles, II et al. | 73/718 |
| 5,874,680 | 2/1999 | Moore | 73/756 |
| 5,880,373 | 3/1999 | Barton | 73/754 |
| 5,889,212 | 3/1999 | Guthrie et al. | 73/720 |
| 5,908,990 | 6/1999 | Cummings | 73/861.22 |

* cited by examiner

Primary Examiner—William Oen
(74) Attorney, Agent, or Firm—Merchant & Gould P.C.

(57) ABSTRACT

The differential pressure triggering device has a housing having first and second adjacent inner chambers with respective pressure inlets. A pressure differential responsive diaphragm extends between the inner chambers. An iron disc is positioned inside the first inner chamber and is attached to the diaphragm so as to move along a predetermined displacement course as a result of a deflection of the diaphragm. A trigger unit is mounted outside the housing alongside the first inner chamber. The trigger unit has an actuator and a switch device responsive to a motion of the actuator for producing a triggering action. A magnet is attached to the actuator in magnetic interactive mobile arrangement with the iron disc so that a displacement of the iron disc resulting from a deflection of the diaphragm, causes a corresponding displacement of the magnet, thereby driving the actuator which operates the switch device.

13 Claims, 2 Drawing Sheets

DIFFERENTIAL PRESSURE TRIGGERING DEVICE

FIELD OF THE INVENTION

The present invention relates to differential pressure sensors, and more particularly to a differential pressure triggering device deprived of a traversing actuating tappet.

BACKGROUND

Differential pressure sensors usually have a tappet passing through a housing wall of the sensor to actuate an external switch device. Such a configuration is necessarily open to pressure leaks and yields to inaccurate readings and/or results, especially in high pressure applications such as for example in ventilation ducts.

Known in the art is U.S. Pat. No. 5,024,294 (Van Fossen et al.), which shows a differential pressure transducer having a diaphragm subjected to different pressures from each side. A rod is attached to the diaphragm, the rod supporting a magnet moving inside the transducer's housing as a function of the measured pressure differential. The rod is suspended at one end by a tension spring, the opposite end of the rod being attached to the diaphragm. The displacement of the rod caused by the flexion of the diaphragm is measured by means of a Hall effect sensor mounted in the transducer's housing.

Also known in the art is U.S. Pat. No. 3,967,504 (Akeley), which shows a differential pressure sensor having a spring subjected to compression when the pressure in a high pressure line exceeds the pressure in a low pressure line.

Also known in the art is U.S. Pat. No. 3,831,588 (Rindner), which shows a pressure measuring device producing an electric signal proportional to the pressure. The device is housed in a chamber having a flexible diaphragm to transmit external pressure to the sensor.

Also known in the art is U.S. Pat. No. 5,817,943 (Welles, II et al.), which shows a pressure sensor having a structure for generating a magnetic force to balance forces on opposite sides of a flexible diaphragm centered within a pressure chamber in which a fluid under pressure is introduced on a side of the diaphragm.

Also known in the art is U.S. Pat. No. 5,303,595 (Shoji et al.), which shows a pressure sensor based on a magnetostriction effect.

Also known in the art is U.S. Pat. No. 5,355,714 (Suzuki et al.) which shows a pressure sensor using a pressure responsive magnetic film to vary the inductance of a coil. The diaphragm is arranged to displace depending on a pressure differential, thereby changing the inductance of the coil.

Also known in the art are U.S. Pat. No. 3,575,054 (Glista); U.S. Pat. No. 3,590,638 (Anastasia); U.S. Pat. No. 4,336,567 (Anastasia); U.S. Pat. No. 4,373,385 (Boutteville et al.); U.S. Pat. No. 4,453,412 (Nakane); U.S. Pat. No. 4,475,405 (Corpron et al.); U.S. Pat. No. 4,487,074 (Herden); U.S. Pat. No. 4,671,116 (Glennon et al.); U.S. Pat. No. 4,716,492 (Charboneau et al.); U.S. Pat. No. 4,876,893 (Kato et al.); U.S. Pat. No. 5,068,503 (Sladky); U.S. Pat. No. 5,219,041 (Greve); U.S. Pat. No. 5,315,878 (Birenheide); U.S. Pat. No. 5,437,241 (Rosenberg et al.); U.S. Pat. No. 5,760,310 (Rud, Jr. et al.); U.S. Pat. No. 5,874,680 (Moore); U.S. Pat. No. 5,880,373 (Barton); U.S. Pat. No. 5,889,212 (Guthrie et al.); and U.S. Pat. No. 5,908,990 (Cummings) which all show various types of pressure sensors illustrating the state of the art.

SUMMARY

An object of the invention is to provide a differential pressure triggering device deprived of an actuating tappet crossing the device's housing wall.

A subsidiary object of the invention is to provide such a differential pressure triggering device that is simple in construction, thus highly cost-competitive, yet is highly reliable and efficient.

Another subsidiary object of the invention is to provide such a differential pressure triggering device which provides accurate readings and triggering functions even if the device is subjected to high positive or negative pressures.

According to the present invention, there is provided a differential pressure triggering device, comprising a housing having first and second adjacent inner chambers, and first and second pressure inlets communicating respectively with the first and second inner chambers. A pressure deflectable member extends between the inner chambers, the deflectable member being responsive to a pressure differential between the inner chambers. A first magnetic member is positioned inside the first inner chamber and is attached to the deflectable member so that a deflection of the deflectable member displaces the first magnetic member along a predetermined displacement course inside the first inner chamber. A trigger unit is mounted outside the housing alongside the first inner chamber, the trigger unit including an actuator and a switch device responsive to a motion of the actuator for producing a triggering action. A second magnetic member is attached to the actuator in magnetic interactive mobile arrangement with the first magnetic member so that a displacement of the first magnetic member along the displacement course, resulting from a deflection of the deflectable member, causes a corresponding displacement of the second magnetic member, thereby driving the actuator which operates the switch device.

BRIEF DESCRIPTION OF THE DRAWINGS

A detailed description of preferred embodiments will be given herein below with reference to the following drawings, in which like numbers refer to like elements.

DETAILED DESCRIPTION OF THE PREFERRED EMBODIMENTS

Figure 1:
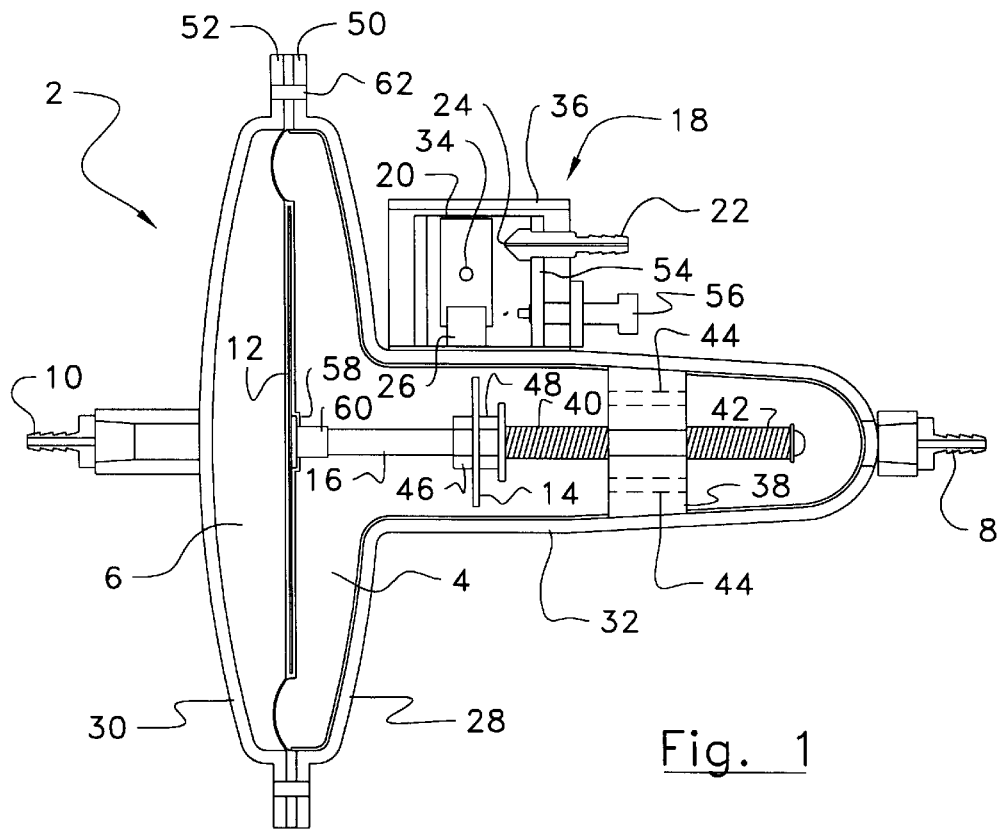
FIG. 1 is a schematic cross-section view of a differential pressure triggering device according to the invention.
Figure 2:
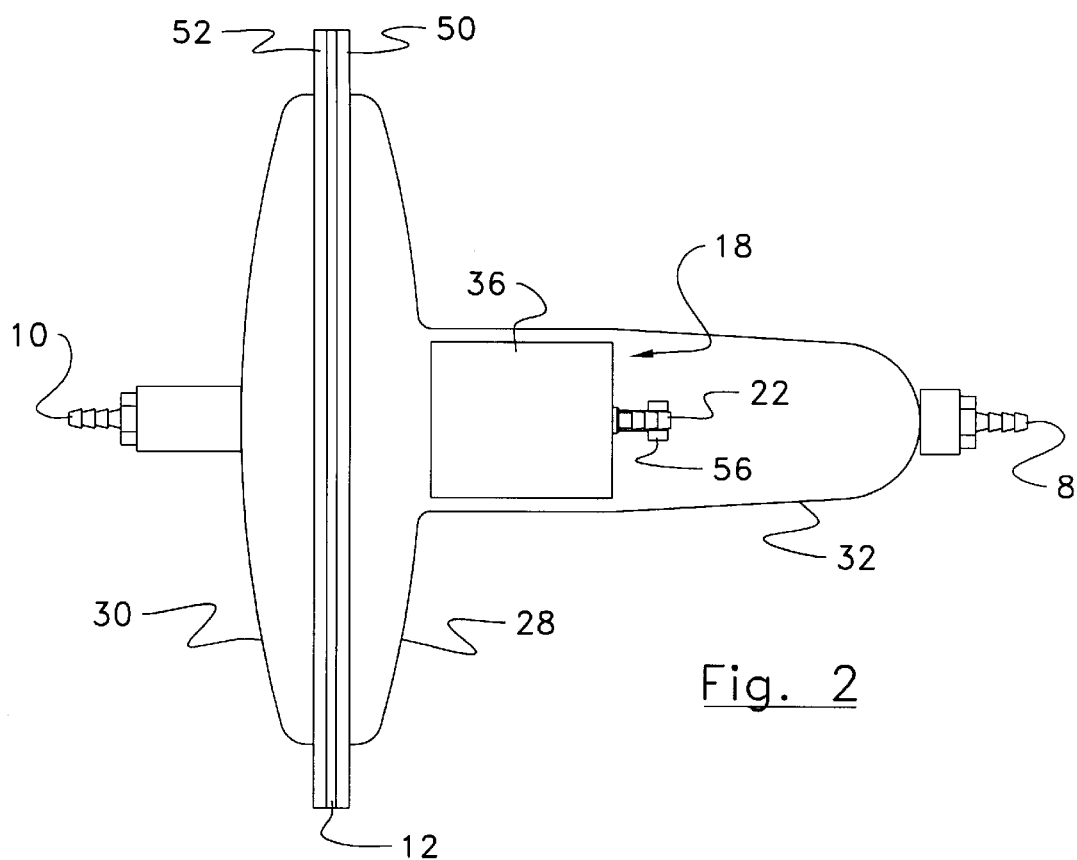
FIGS. 2, 3 and 4 are respectively top, side elevation and rear views of the differential pressure triggering device shown in FIG. 1.
Figure 3:
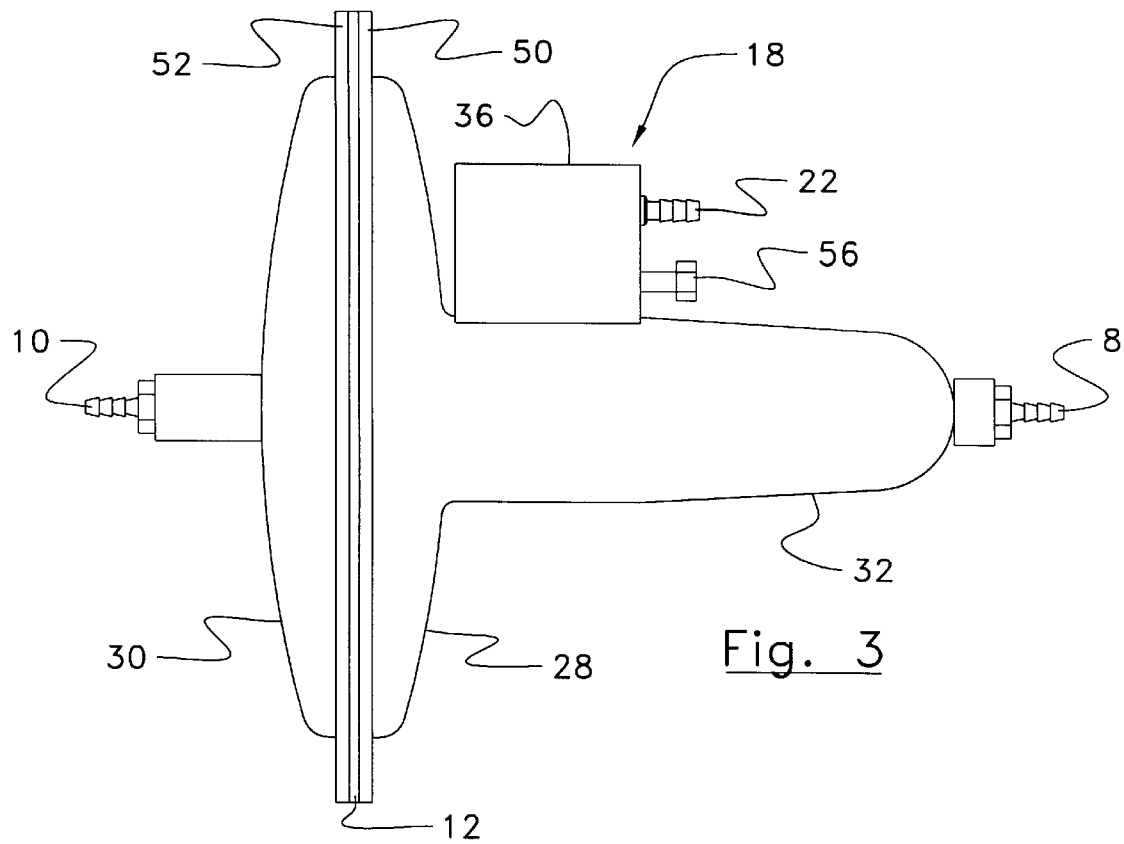

Referring to FIGS. 1–4, there is shown a differential pressure triggering device according to the invention. The device has a housing 2 forming first and second adjacent inner chambers 4, 6. First and second pressure inlets 8, 10 communicate respectively with the first and second inner chambers 4, 6. Typically but not restrictively, the first pressure inlet 8 may be used to receive a fluid whose pressure level may trigger an action, e.g. the dynamic pressure in a duct (not shown in the Figures), while the second pressure inlet 10 may be used to receive a fluid having a static pressure, e.g. for reference purposes. A pressure deflectable member e.g. in the form of a flexible membrane or diaphragm 12 extends between the inner chambers 4, 6. The membrane 12 is responsive to a pressure differential between the inner chambers 4, 6, so as to deflect to the left or the right from its initial resting position depending on whether the pressure in the first chamber 4 is higher or lower than the pressure in the second chamber 6.

A first magnetic member e.g. in the form of a metallic (e.g. iron) disc 14 is positioned inside the first inner chamber 4 and is attached to the membrane 12 e.g. by a rod 16 so that a deflection of the membrane 12 displaces the disc 14 along a predetermined displacement course inside the first inner chamber 4. In the illustrated embodiment, the displacement of the disc 14 simply follows the deflection of the membrane 12. Other arrangements causing a displacement of the disc 14 in response to a deflection of the membrane 12 can be used.

A trigger unit 18 is mounted outside the housing 2 alongside the first inner chamber 4. The trigger unit 18 has an actuator e.g. in the form of a pivotably mounted arm 20 having an upper end whose right face can at least partially shut an opening 24 of a tubular insert 22 when the upper end of the arm 20 swivels clockwise. The shutting of the opening 24 may be used to block passage of a fluid in the tubular insert 22, thereby producing a triggering action. The tubular insert 22 thus forms a pneumatic switch responsive to the motion of the actuator. A contact sensitive switch or any other suitable types of switch or switch device can be used in replacement to the pneumatic switch formed of the insert 22.

A second magnetic member e.g. in the form of a magnet 26 is attached to the lower end of the arm 20 in magnetic interactive mobile arrangement with the disc 14 so that a displacement of the disc 14 along the displacement course, resulting from a deflection of the membrane 12, causes a corresponding displacement of the magnet 26, thereby driving the arm 20 of the actuator which operates the switch device formed of the insert 22.

Thus, in operation, the magnet 26 will follow any displacement of the disc 14 as a result of a right or left deflection of the membrane 12 caused by the pressure differential between the inlets 8, 10. This magnet 26 and disc 14 arrangement communicates the motion of the membrane 12 inside the housing 2 to the switch device outside the housing 2 without any element traversing the housing 2.

The housing 2 may be formed of first and second complementary cup-shaped portions 28, 30 secured together and defining respectively the first and second inner chambers 4, 6. The first cup-shaped portion 28 may have a reduced diameter central longitudinal extension 32 projecting away from the membrane 12. The rod 16 supporting the disc 16 has an end connected to and projecting from the membrane 12 and is longitudinally extending in the central longitudinal extension 32. The disc 14 is mounted on the rod 16 and is positioned inside the longitudinal extension 32 of the first cup-shaped portion 28. The metallic disc 14 preferably has a diameter slightly smaller than an inner diameter of the extension 32, so as to have a portion as close as possible with respect to the magnet 26 for best magnetic interaction. The circular shape of the disc 14 makes it operative no matter its angular position about the rod 16. The shapes of the disc 14 and the inner section of the extension 32 may take other suitable configurations, e.g. rectangular. The trigger unit 18 is mounted on the longitudinal extension 32 of the first cup-shaped portion 28.

In the illustrated embodiment, and as it is apparent in the FIGS. 1–4, the trigger unit 18 is mounted on or near a top portion of the housing 2 so that the arm 20 swivels like a pendulum. The arm 20 is pivotally mounted about a pivot axis 34 extending crosswise to the displacement course of the disc 14. The insert 22 is positioned on a side of the upper end of the arm 20 along a swivelling course thereof.

The trigger unit 18 may have a housing 36. The insert 22 extends through the housing 36, with the opening 24 close to the upper end of the arm 20 so that the opening is blocked at least partially by the upper end of the arm 20 when the upper end reaches a predetermined position along the swivelling course as a result of a swivelling action of the arm 20. The arm 20 may be pivotally supported by a bracket 54 slideably mounted in the housing 36 and moveable closer and away from the opening 24 of the insert 22 secured to the housing 36. An adjustment screw 56 is screwably mounted through the housing 36 and has an end attached to the bracket 54 so that the bracket 54 is moveable by subjecting the adjustment screw 56 to a rotation. This arrangement forms a device for adjusting a degree of the motion of the arm 20 required for causing the switch device to produce the triggering action. Other adjusting configurations can be used, for example a sliding assembly displacing the tubular insert 22 towards or away from the arm 20 rather than the arm 20 relative to the tubular insert 22.

The rod 16 may be provided with a centering support bushing 38 slideably mounted inside the extension 32.

The rod 16 may be also provided with a pair of longitudinal springs 40, 42 between which the bushing 38 is inserted, to urge it in a longitudinal centered position along the rod 16.

If the first and second pressure inlets 8, 10 are oppositely positioned with respect to each other, with the bushing 38 extending therebetween as illustrated, then the bushing 38 preferably has at least one widthwise through hole 44 providing communication between the first pressure inlet 8 and the membrane 12 for proper operation of the device.

The rod 16 may be metallic and may have a longitudinal threaded portion along which the disc 14 is positioned and locked in place by means of a pair of opposite bolts 46, 48 screwed on the threaded portion and pressing opposite sides of the disc 14. The membrane 12 may have a center iron washer 58 with a nut 60 weld at its center, to receive the threaded end of the rod 16.

The cup-shaped portions 28, 30 may have adjoining peripheral flanges 50, 52. The membrane 12 may be in rubber and may have a center portion and a peripheral portion thinner than the center portion. The peripheral portion has an edge circumferentially pressed between the peripheral flanges 50, 52 of the cup-shaped portions 28, 30 to hold the membrane 12 while allowing deflection or traverse displacement in response to a pressure differential.

Figure 4:
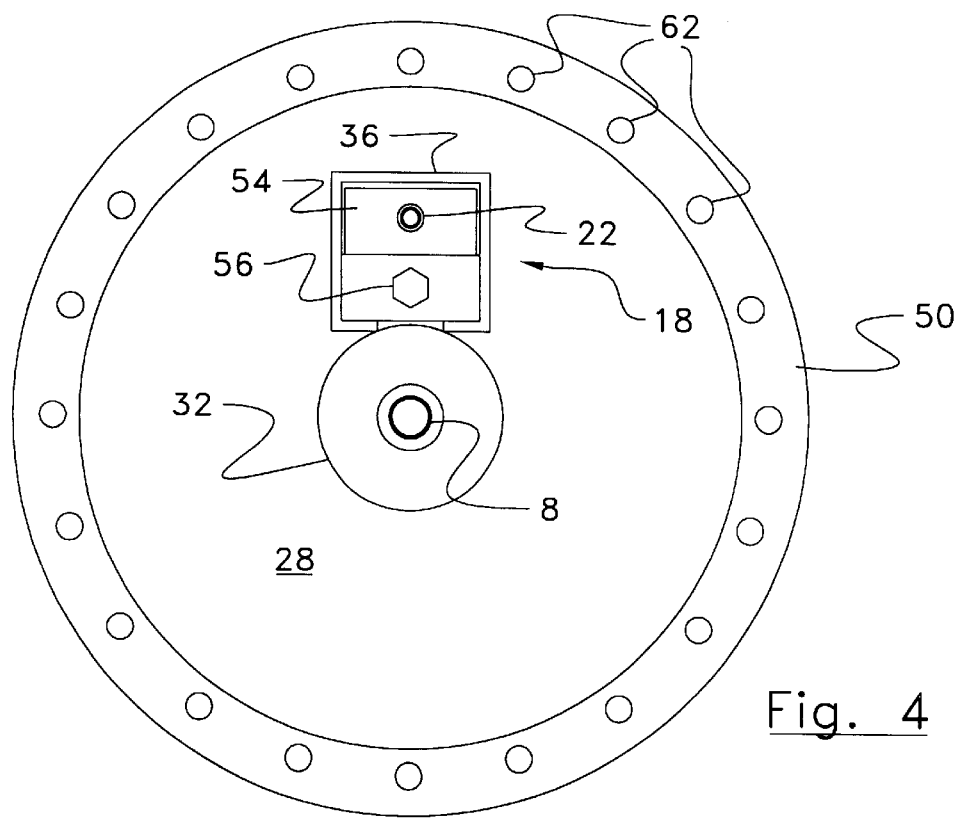

The peripheral flanges 50, 52 may have circumferentially distributed respective holes 62 for passage of locking nuts, as best shown in FIG. 4.

Normally, the membrane 12 separates entirely the two inner chambers 4, 6. But, if needed, it may separate only partially the two inner chambers 4, 6 from each other, provided that the pressure differential remains sufficient to deflect the membrane 12 for a reading.

The disc 14 and the magnet 26 may be interchanged with each other. Two magnets operating in attraction or repulsion may be also used, provided that the set-up of the device is adapted for this purpose A reading of the pressure at the center of the chambers 4, 6 can be given, if needed, by a device such as a pitot tube (not shown in the Figures).

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A differential pressure triggering device, comprising:
a housing having first and second adjacent inner chambers, and first and second pressure inlets communicating respectively with the first and second inner chambers;
a pressure deflectable member extending between the inner chambers, the deflectable member being responsive to a pressure differential between the inner chambers;
a first magnetic member positioned inside the first inner chamber and attached to the deflectable member so that a deflection of the deflectable member displaces the first magnetic member along a predetermined displacement course inside the first inner chamber;
a trigger unit mounted outside the housing alongside the first inner chamber, the trigger unit including an actuator and a switch means responsive to a motion of the actuator for producing a triggering action; and
a second magnetic member attached to the a actuator in magnetic interactive mobile arrangement with the first magnetic member so that a displacement of the first magnetic member along the displacement course, resulting from a deflection of the deflectable member, causes a corresponding displacement of the second magnetic member, thereby driving the actuator which operates the switch means.

2. The differential pressure triggering device according to claim 1, wherein:
the housing comprises:
first and second complementary cup-shaped portions defining respectively the first and second inner chambers, the first cup-shaped portion having a reduced diameter central longitudinal extension projecting away from the deflectable member; and
securing means for securing the housing portions together;
the first magnetic member is attached to the deflectable member by means of a rod connected to and projecting from the deflectable member and longitudinally extending in the central longitudinal extension, the first magnetic member being mounted on the rod and positioned inside the longitudinal extension of the first cup-shaped portion; and
the trigger unit is mounted on the longitudinal extension of the first cup-shaped portion.

3. The differential pressure triggering device according to claim 2, wherein:
the trigger unit is mounted on or near a top portion of the housing;
the actuator comprises an arm pivotally mounted about a pivot axis extending crosswise to the displacement course of the first magnetic member, the arm having a swivelling lower end provided with the second magnetic member, and an opposite swivelling upper end; and
the switch means is positioned on a side of the upper end along a swivelling course thereof.

4. The differential pressure triggering device according to claim 3, wherein:
the trigger unit comprises a housing; and
the switch means comprises a tubular element extending through the housing of the trigger unit, the tubular element having an opening close to the upper end of the arm so that the opening is blocked at least partially by the upper end of the arm when the upper end reaches a predetermined position along the swivelling course as a result of a swivelling action of the arm.

5. The differential pressure triggering device according to claim 2, wherein the rod is provided with a centering support bushing slideably mounted inside the extension.

6. The differential pressure triggering device according to claim 5, wherein the rod is provided with a pair of longitudinal springs between which the bushing is inserted.

7. The differential pressure triggering device according to claim 5, wherein:
the first and second pressure inlets are oppositely positioned with respect to each other, with the bushing extending therebetween; and
the bushing has at least one widthwise through hole providing communication between the first pressure inlet and the deflectable member.

8. The differential pressure triggering device according to claim 2, wherein the rod has a longitudinal threaded portion, the first magnetic element being positioned along the threaded portion and locked in position with a pair of opposite bolts mounted on the threaded portion and pressing opposite sides of the first magnetic element.

9. The differential pressure triggering device according to claim 2, wherein:
the cup-shaped portions have adjoining peripheral flanges; and
the deflectable member comprises a rubber membrane having a center portion and a peripheral portion thinner than the center portion, the peripheral portion being circumferentially pressed between the peripheral flanges of the cup-shaped portions.

10. The differential pressure triggering device according to claim 9, wherein the peripheral flanges of the cup-shaped portions have circumferentially distributed respective holes for passage of locking nuts.

11. The differential pressure triggering device according to claim 1, wherein the trigger unit comprises a means for adjusting a degree of the motion of the actuator required for causing the switch means to produce the triggering action.

12. The differential pressure triggering device according to claim 4, wherein the trigger unit comprises:
a bracket slideably mounted in the housing of the trigger unit and moveable closer and away from the opening of the tubular element, the bracket supporting the arm of the actuator; and
an adjustment screw screwably mounted through the housing of the trigger unit and having an end attached to the bracket so that the bracket is moveable by screwing the adjustment screw.

13. The differential pressure triggering device according to claim 2, wherein:
the first magnetic element comprises a metallic disc having a diameter slightly smaller than an inner diameter of the extension; and
the second magnetic element comprises a magnet secured to the actuator.

* * * * *